Sept. 20, 1932. R. LA FRANCE 1,878,863
GLASS BLOWING MACHINE
Original Filed Jan. 30, 1922  10 Sheets-Sheet 1

INVENTOR
RICHARD LA FRANCE
BY J. F. Rule.
HIS ATTORNEY

Sept. 20, 1932.   R. LA FRANCE   1,878,863
GLASS BLOWING MACHINE
Original Filed Jan. 30, 1922   10 Sheets-Sheet 5

INVENTOR
RICHARD LA FRANCE
BY
HIS ATTORNEY

Patented Sept. 20, 1932

1,878,863

UNITED STATES PATENT OFFICE

RICHARD LA FRANCE, OF TOLEDO, OHIO, ASSIGNOR TO OWENS-ILLINOIS GLASS COMPANY, OF TOLEDO, OHIO, A CORPORATION OF OHIO

GLASS BLOWING MACHINE

Application filed January 30, 1922, Serial No. 532,606. Renewed June 29, 1932.

My invention relates to glass forming machines. In its preferred form it comprises a machine having a carriage rotating continuously about a vertical axis and having a number of units each including a blank mold to receive a charge of glass and in which the glass is partially formed, a neck mold, and a finishing mold in which the parison is blown to its final shape. The blank molds, as the machine rotates, are successively brought to charge receiving position, each with its upper end open to receive a charge of glass which is automatically dropped therein.

After the blank mold receives its charge, a closure plate or head is brought into position to close said end, and if desired, air pressure is supplied through said head to compact the glass in the mold and to form the neck of the bottle or other article in the neck mold which is below and in register with the blank mold. The air may be exhausted from the neck mold to produce suction for forming the neck, such suction being used either to supplement the air pressure above mentioned or as a substitute therefor. Air pressure is supplied through the neck of the blank to blow the parison in the blank mold, thereby partially forming the bottle, or other article.

A turn-over group, including the parison mold (comprising a blank mold and neck mold) with the parison therein, is rotated about a horizontal axis to invert the molds and swing the parison downward to normal position, namely, neck end up. The body blank mold is then opened and re-inverted while the finishing mold encloses the blank supported from the neck mold. The parison is then blown, the neck mold released and re-inverted, the finishing mold opened and the blown article discharged.

A primary object of the invention is to provide a machine of the continuously rotating type with the parts designed and co-operating in a manner to permit the machine to be run at a comparatively high speed and have a large output. Various features of novelty embodied in the machine are particularly designed and adapted to co-operate in the attainment of this primary object of high speed and large output, as will appear more fully hereinafter.

A feature of the invention comprises the use of individual heads for closing the receiving ends of the blank molds and through which air is supplied for compacting the glass and forming the necks of the articles, and also individual blowing devices for blowing the parisons. This facilitates rapid production by permitting the blowing operations to be continued throughout any desired extent of rotation of the machine, instead of being limited as in machines wherein a single blowing means operates successively on the several molds.

A further feature of the invention relates to improved means for blowing cooling air on the molds. Means are provided whereby cooling air may be supplied continuously to the finishing molds and the bottom plates thereof, and practically continuously to the blank molds.

A further feature of the invention relates to an improved construction in which the blank mold is inverted with the parison therein and the parison thus centered over the bottom plate of the finishing mold before the blank mold opens. This construction allows a rapid inverting or swinging down of the parison and accurate centering thereof in the finishing mold, permitting a much higher speed of the machine than is possible with machines in which the blank mold is opened without being turned over, so that the bare blank or parison is inverted.

A further feature of the invention relates to the use of individual funnel guides for directing the glass into the blank molds, in combination with the closure plates or heads for closing the charge receiving ends of the blank molds after the latter have received their charges. The funnel and head are mounted on a support movable radially on the mold carriage permitting the funnel after it has guided a charge into the mold, to be quickly moved into position to bring the closure plate or head to mold closing position. Air pressure may then be admitted through said head. The arrangement is such that the air pressure may be applied almost immediately after the glass enters the mold and before it has become chilled.

Other objects of the invention and features of novelty will appear hereinafter.

The present application discloses certain novel features also disclosed in my co-pending application Serial Number 420,905, filed November 1, 1920.

In the accompanying drawings:

Figures 21 to 28 inclusive are diagrammatic views of the molds at successive periods during the formation of a bottle.

Figure 1:
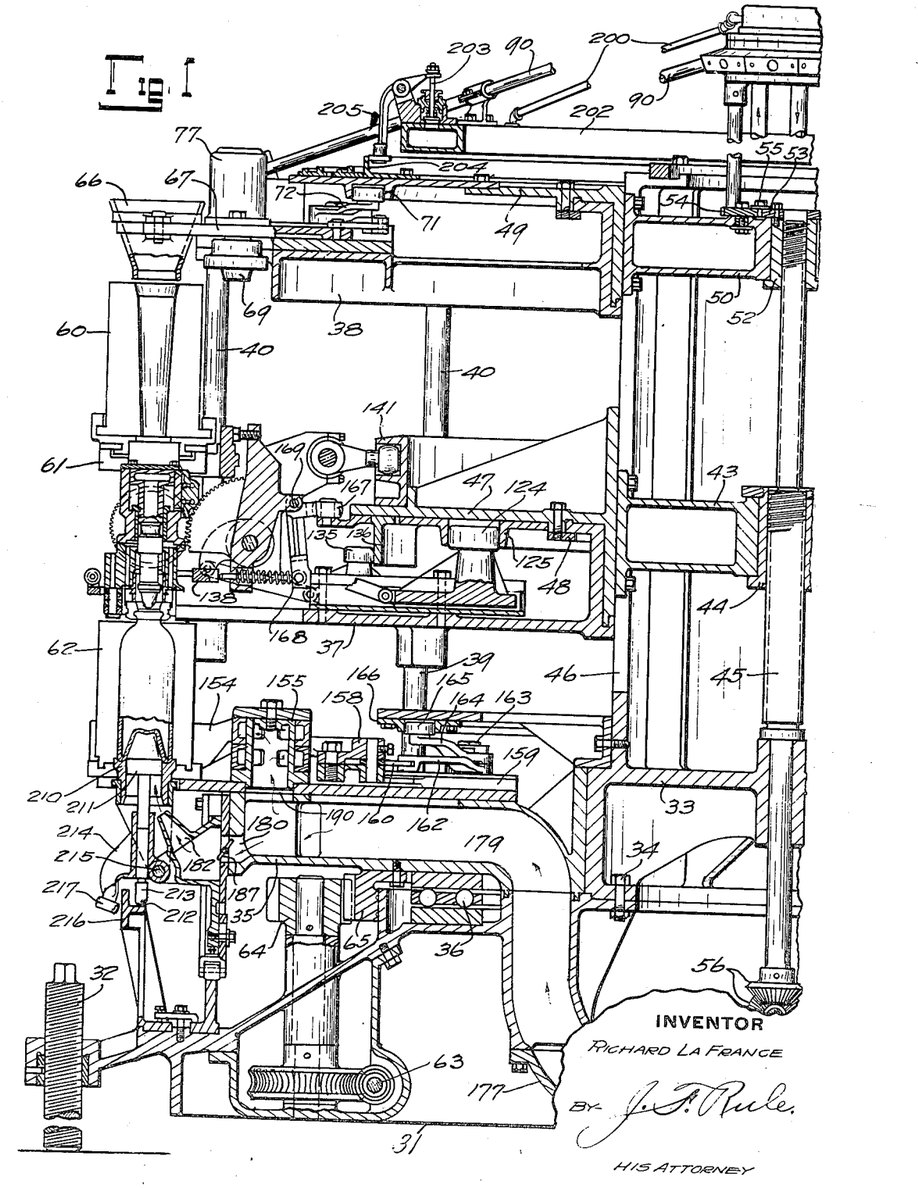
Figure 1 is a sectional elevation of a portion of a machine constructed in accordance with my invention, parts being broken away.
Figures 4, 6:
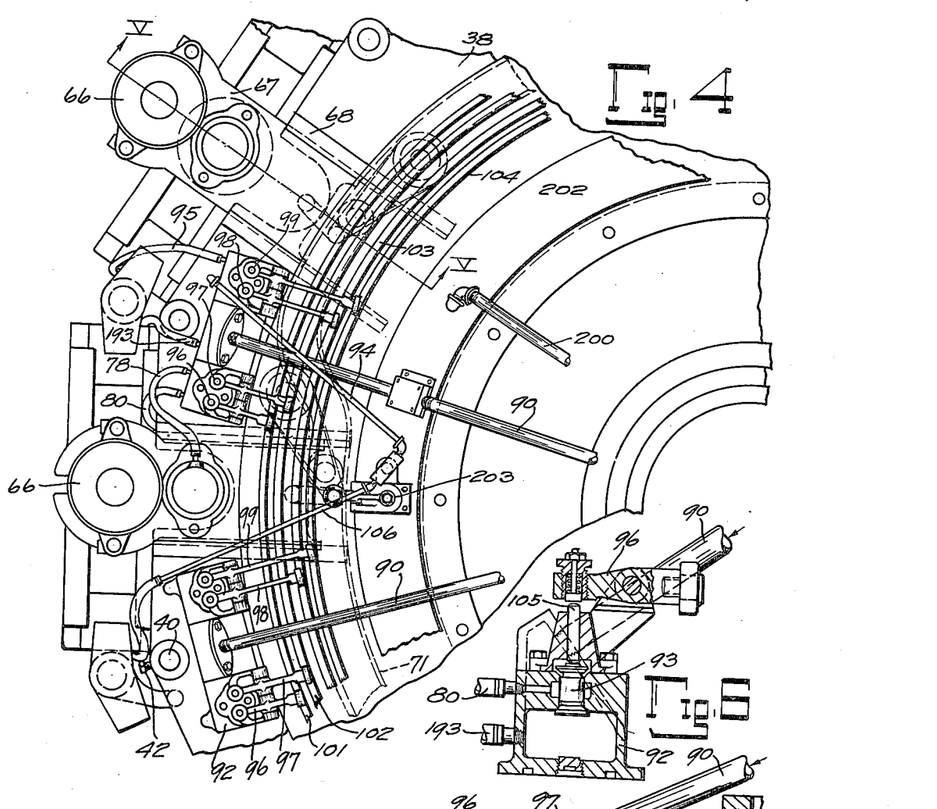
Figure 4 is a fragmentary plan view of a portion of the machine and shows funnel guides, blowing heads, air and vacuum controlling valves, and cams for operating said valves.
Figure 6 is a section showing one of the valves shown on Figure 4.

Referring particularly to Figure 1, the stationary base 31 of the machine is adjustably mounted on screw-threaded posts 32. A central cylindrical column 33 rises from the base 31 and is secured thereto by bolts 34. A continuously rotating carriage comprises a lower section or spider 35 mounted to run on roller bearings 36, an intermediate section 37 and an upper section 38. The intermediate section 37 is supported by standards 39 rising from the section 35. The upper section 38 is likewise supported by standards 40 rising from the section 37. The standards 40 extend through bearing sleeves in the section 38 and are clamped thereto by set screws 42 (Fig. 4), which may be loosened to permit vertical adjustment of said section. The section 37 is in like manner adjustably connected to the standards 39.

A yoke 43 (Fig. 1) is mounted on a sleeve 44 which surrounds a vertical adjusting rod 45 and has a screw threaded connection with the rod. The yoke 43 is movable up and down in vertical guideways 46 in the center column 33. A stationary cam-carrying plate 47 is bolted to the yoke 43 for adjustment up and down therewith. The section 37 of the mold carriage has an interlocking rotatable connection with the plate 47 by means of a ring 48, whereby the section 37 is adjustable up and down with the yoke 43. The upper section 38 of the carriage has a similar connection with a cam-supporting plate 49 secured to a yoke 50 in which is journalled a bearing sleeve 52. A gear wheel 53 (Figs. 1 and 7) secured to the sleeve 52, meshes with a gear 54 journalled in the yoke 50. These gears are normally locked against rotation by a clamping bolt 55. The vertical adjusting rod 45 is connected through gears 56 (Fig. 8) with a horizontal rod 57 which may be rotated by a hand wheel or wrench. The rotation of the rod 45 causes a vertical adjustment of the yokes 43 and 50 owing to the screw threaded connection of said rod with the sleeves 44 and 52. The pitch of the screw threads in the sleeve 52 is preferably double that of the screw threads in the sleeve 44, so that an adjustment of the intermediate section 37 of the carriage up or down through any given distance will cause an adjustment of the upper section 38 in the same direction but through double the distance. It will thus be seen that when the intermediate section 37 is adjusted toward or from the lower stationary section 35, there is a corresponding relative adjustment of the intermediate and upper sections toward and from each other. The adjustment of the machine in the manner just described adapts it for molds of different lengths. For example, if it is desired to use shorter molds, the intermediate section is adjusted downward a distance corresponding to the reduction in the length of the mold. This correspondingly lowers the neck mold so that it will be in position to co-operate with the shorter finishing mold. The funnel guide carried by the upper section of the carriage and which is used to direct the glass into the blank mold is also lowered to maintain a proper relation to the shorter blank mold. It will be understood that the set screws 42 (Fig. 4) are loosened to permit relative vertical adjustment of the carriage sections.

When it is desired to adjust the intermediate section 37 without relative movement of the upper section 38, or in other words to move the intermediate and upper sections up and down through the same distance, the clamping bolt 55 is loosened, thereby permitting the gears 53 and 54 to rotate. The sleeve 52 is, therefore, free to turn with the rod 45, so that there is no relative up and down movement of said rod and sleeve. The upper section 38 may also be adjusted up and down independently of the intermediate and lower sections by rotating the pinion 54, thereby rotating the gear 53 and sleeve 52 while the shaft 45 remains stationary. The pinion 54 may be rotated by means of a wrench or other tool applied to the squared end 58 of its shaft.

The machine comprises a number of sections or units symmetrically arranged around the mold carriage and each comprising a blank mold 60, a neck mold 61, (said molds together forming a parison mold), a finishing mold 62 and mechanism for actuating the molds. The machine is rotated continuously by a motor (not shown) connected to a drive shaft 63 (Fig. 1) geared to a vertical shaft on which is a pinion 64 running in mesh with an annular gear 65 on the mold carriage.

Figure 5:
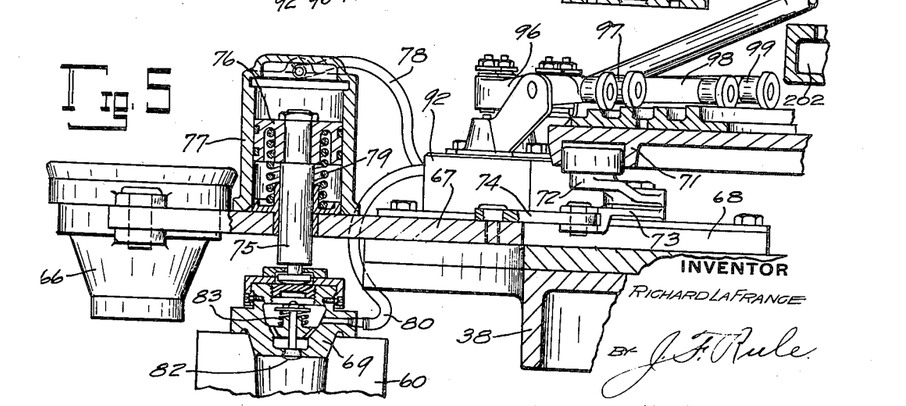
Figure 5 is a section at the line V—V on Figure 4.

As the carriage rotates, the blanks molds 60 are brought in succession to a charging position at which charges of glass are dropped into the molds through their open upper ends. These charges are preferably supplied by an automatic feeder (not shown) operating in synchronism with the movement of the machine to drop an individual mass or charge of glass into each blank mold as it passes beneath the feeder. Associated with each blank mold is a funnel-shaped guide 66 supported on a carrying plate 67 mounted to slide radially in guides 68 (Figs. 4 and 5) on the carriage section 38. When a blank mold reaches the charging position, its funnel 66 is in register with the mold and guides the charge of glass into the mold. The supporting plate 67 is moved radially outward immediately after the mold receives its charge, and thereby brings a mold closing head or plate 69, also carried by the plate 67, into register with the blank mold. The radial movement of the plate 67 is controlled by a stationary cam 71 which imparts the reciprocating movement to plate 67 through crank arms 72 and 73 (Fig. 5), the latter connected through a link 74 to the plate 67. The head 69 is removably connected to a piston rod 75 (Fig. 5) attached to a piston 76 of an air motor 77. The head 69 is shaped to project downward within the mold and may be readily replaced by a head projecting a greater or less distance into the mold, thereby permitting the capacity of the mold to be varied to adapt it for making ware of different sizes. When the plate 67 is moved outward to bring the head 69 over the mold, said head is immediately lowered into contact with the mold by admitting air under pressure through a pipe 78 to the motor. The piston 76 is lifted to withdraw the head 69 by means of a spring 79. Air under pressure may be admitted through the head 69 to compact the glass and cause it to take the shape of the neck mold. The air is supplied through a pipe 80 and a check valve 82 in the head 69, which valve is normally closed by a spring 83.

The means for supplying compressed air to the blowing head 69, the motor 77, the motor 129, and for blowing the glass to hollow form, together with the valve mechanism for controlling the air, will now be described.

Figure 2:
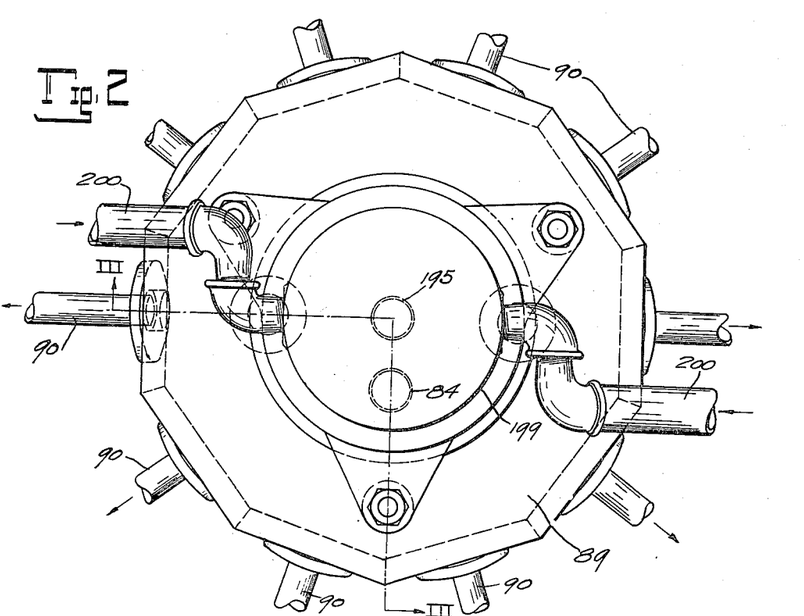
Figure 2 is a top plan view of the distributing head forming the top portion of the machine.
Figure 3:
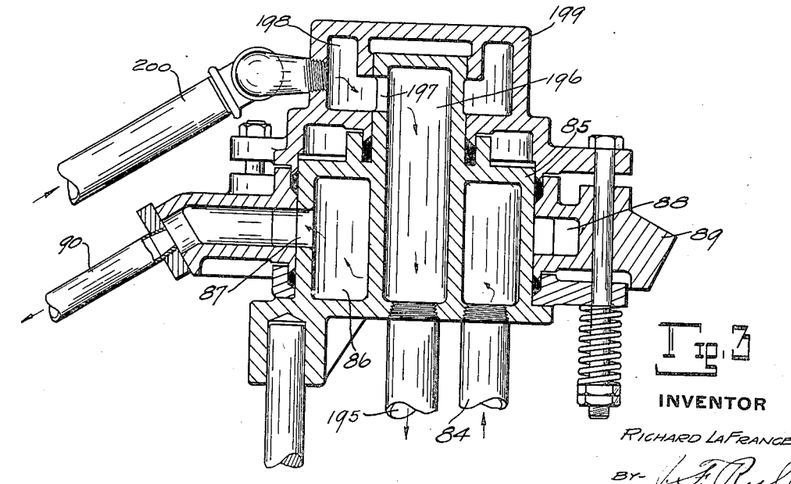
Figure 3 is a section at the line III—III on Figure 2.

Referring particularly to Figures 2 and 3, air under pressure is supplied from any suitable source through a pipe 84 to a distributing head at the top of the machine. This head comprises a stationary drum 85 having an annular chamber 86 into which the pipe 84 opens, said chamber communicating through ports 87 with an annular passageway 88 formed in a head 89 which is secured to and rotates with the mold carriage. Pipes 90 extend radially outward from the head 89 to valve casings or boxes 92 mounted on the upper section 38 of the carriage, there being one of said casings for each set of molds. A constant supply of air under pressure is maintained in the valve boxes 92. Valves 93 (Fig. 6) in the box 92 control the supply of air distributed from said box through the conduits 80 and 78 before-mentioned, and conduits 94 and 95, there being four such valves in each head. These valves are controlled respectively by levers 96, 97, 98 and 99 actuated by stationary cams 101, 102, 103 and 104. Each valve 93 (Fig. 6) is normally held closed by the air pressure within the box 92, but is opened by its actuating lever, as 96, operating through a pin 105.

The valve operating levers 96 and 97 respectively control the air supply through the pipes 80 and 78 leading to the blow head 69 and the air motor 77, as above described.

Figures 15, 16:
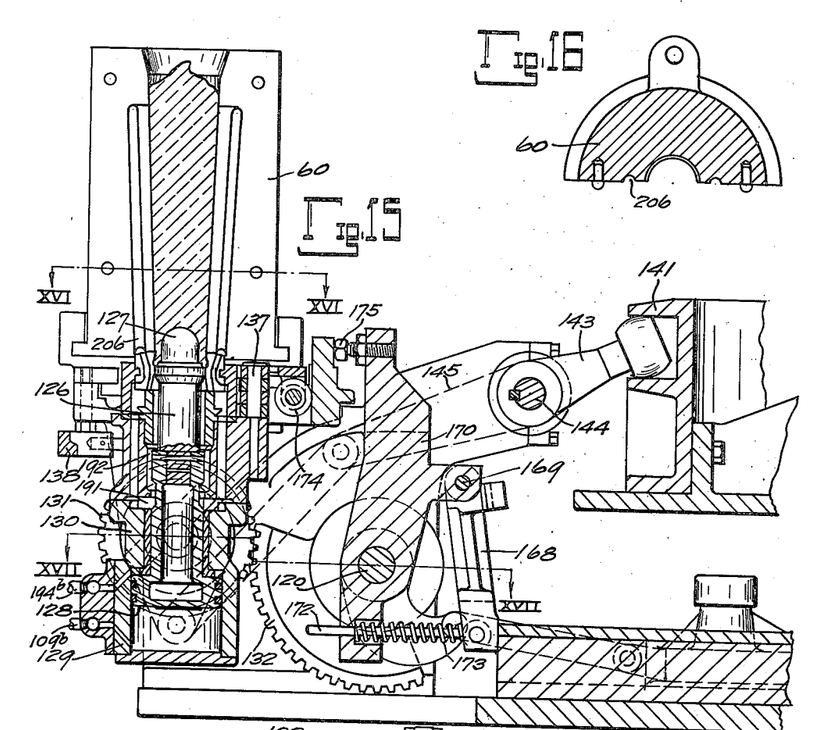
Figure 15 is a sectional elevation of a turnover group, the parison mold being in its normal or charge receiving position.
Figure 16 is a section at the line XVI—XVI on Figure 15.

The valve operating lever 98 in like manner controls the air supply through the pipe 94 and a pipe 106 leading to a channel 107 (Fig. 17) in the turn-over shaft 108. From the channel 107 the air is conducted through channels 191 and 192 (Fig. 15) leading upward along the plunger 126. Air is thereby supplied for expanding the blank after the plunger is withdrawn, as hereinafter explained.

Figure 9:
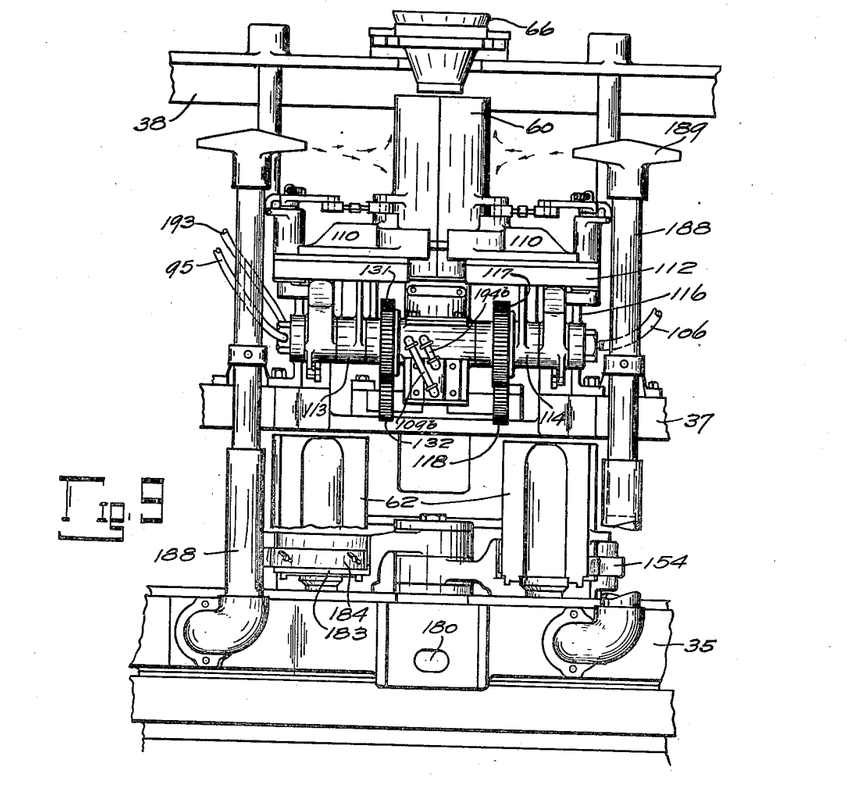
Figure 9 is a front elevation of one of the heads or units including a set of molds and means for inverting the blank mold and neck mold.
Figure 17:
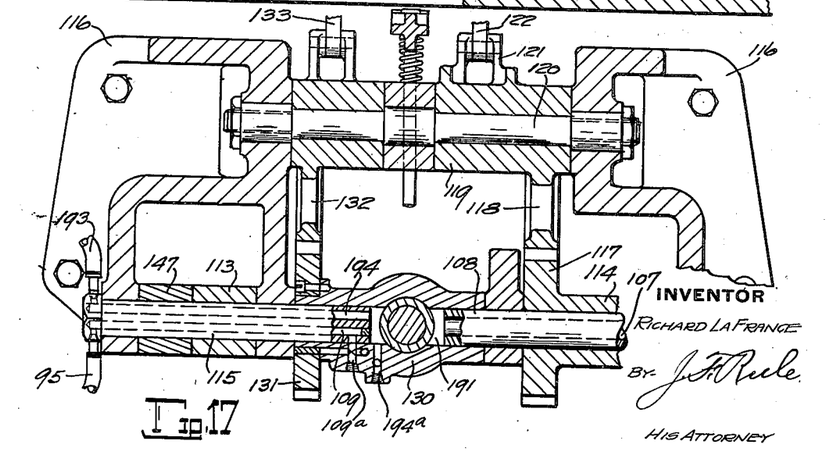
Figure 17 is a section at the line XVII—XVII on Figure 15.

The valve operating lever 99 actuates a valve to control the supply of air to the pipe 95 which leads to a channel 109 in the turn-over shaft 115 (Fig. 17). The channel 109 is continued through a port 109ª and a pipe section 109ᵇ (Figs. 9 and 15) to the lower end of a piston cylinder 129. Air is thereby supplied to project the plunger 126. When the air supply below the piston 128 is cut off, the plunger is lowered by air pressure constantly maintained above the piston. This pressure is only applied to an outer annular portion of the upper surface of the piston. This air pressure is supplied through a pipe 193 (Figs. 6, 4 and 17) extending from the air box 92 to a channel 194 in the shaft 115. The channel 194 communicates with a port 194ª opening into a pipe 194ᵇ (Figs. 9 and 15) leading to the upper end of the cylinder 129.

Figures 18, 19, 20:
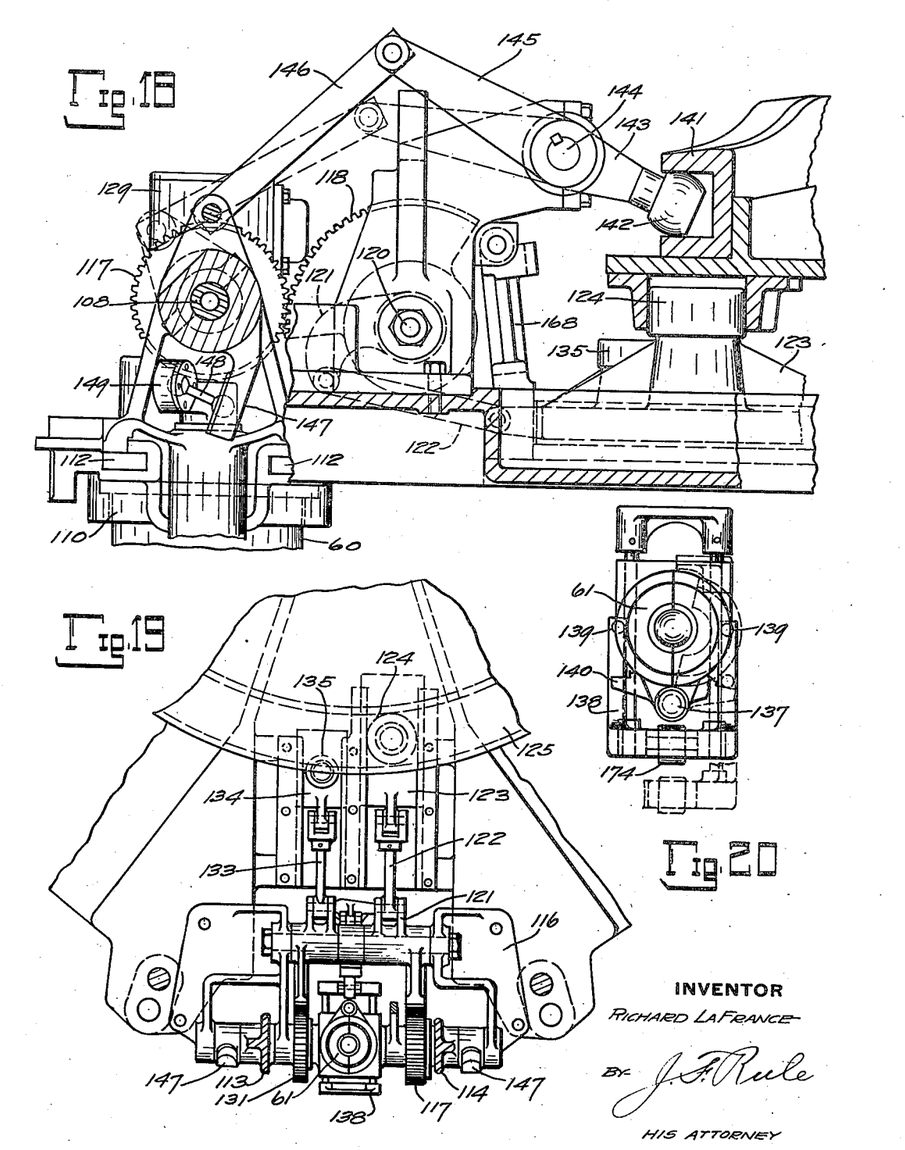
Figure 18 is a part sectional view similar to Figure 15, but with the parison mold inverted.
Figure 19 is a plan view of mold-inverting mechanism, the blank mold being omitted.
Figure 20 is a detail view of the neck mold.

The blank mold 60, neck mold 61 and associated parts are mounted to rotate about a horizontal axis to swing the blank mold from its receiving position (Fig. 15) downward to the Figure 18 position, the neck mold being also inverted by such movement. For convenience, the downward position of the blank mold is herein referred to as its inverted position. Provision is made for inverting the blank mold and neck mold with the parison therein, then opening the blank mold and returning it while the neck mold remains inverted with the parison suspended therefrom. The neck mold (after the finishing mold closes around the blank) is then opened and reinverted. The mechanism for effecting these operations will now be described.

Referring to Figures 9, 12 and 15 to 19, the blank mold 60 is made in sections mounted to slide horizontally toward and from each other. The mold sections are removably mounted on supporting arms 110 slidable in a frame 112, the latter having depending brackets 113 and 114 journalled respectively on the shaft 115 and a shaft 108 (Fig. 17), said shafts being in alignment and forming the axis of rotation of the turn-over group. The shafts 108 and 115 are supported in a non-rotating framework 116 bolted to the carriage section 37. A gear wheel 117 fixed to the bracket 114, meshes with a segmental gear 118 having a hub 119 journalled on a shaft 120 in the frame 116. A crank arm 121 on said hub is connected through a link 122 to a slide block 123 carrying a roll 124 running in a cam groove 125. This cam operates through the connections just described to invert the turn-over group including the blank mold and the neck mold.

The hollow piston rod or plunger 126 terminates in a plunger tip 127 for forming an initial blow opening in the blank, and is formed at its opposite end with the piston 128 working in the cylinder 129 formed on a head 130 which, as shown in Figure 17, is journalled on the shafts 108 and 115. Fixed to the head 130 is a gear wheel 131 which is driven by a gear segment 132 journalled on the shaft 120. The gear 132 has a connection through a link 133 with a slide 134 carrying a roll 135 running on a cam 136.

The neck mold 61 is mounted on the head 130 and comprises sections pivoted on a pin 137 about which they swing for opening and closing the neck mold. A neck mold operating frame 138 arranged to slide horizontally toward and from the center of the machine, carries pins 139 which, when the frame is moved in one direction, engage lugs 140 on the neck mold sections and thereby separate said sections. The movement of the frame 138 in the opposite direction causes the pins 139 to slide along the mold sections and cam them to closed position. The blank mold when closed has a locking connection with the neck mold whereby the latter is held closed and in register with the blank mold. When the blank mold is inverted or swung down from the Figure 15 position to the Figure 18 position, the neck mold being locked to it is also inverted. After the blank mold has been swung down with the parison therein, the blank mold is opened, leaving the bare parison depending from the neck mold which at this time remains closed.

The means for opening the blank mold comprises a stationary cam 141 on which runs a roll 142 on a rock arm 143 keyed to a rock shaft 144 to which are also keyed rock arms 145 connected through links 146 to levers 147 journalled on the shafts 108 and 115 respectively. Links 148 are connected by universal joints to the levers 147 and to rock arms 149 secured to rock shafts 150 journalled in the frame 112. Rock arms 152 on the shafts 150, are connected through links 153 to the blank mold sections. The cam 141 operates through the connections just described to open the blank mold which is then re-inverted after which the sections of the finishing mold 62 are brought together for enclosing the parison.

Figure 7:
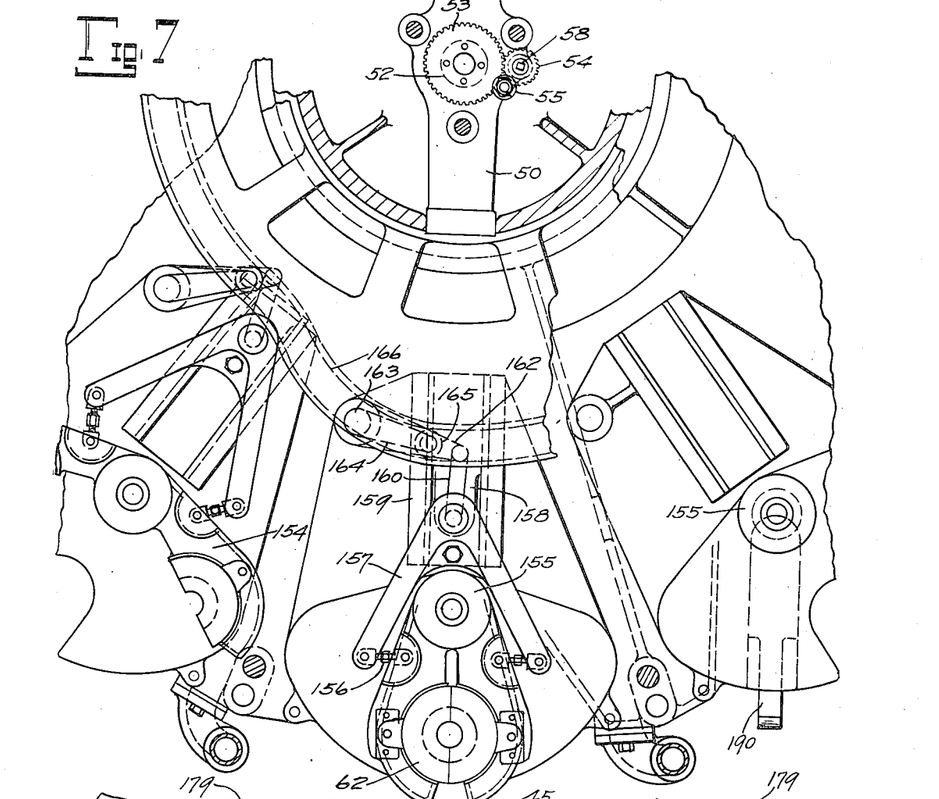
Figure 7 is a sectional plan view showing finishing molds and their operating means.
Figure 8:
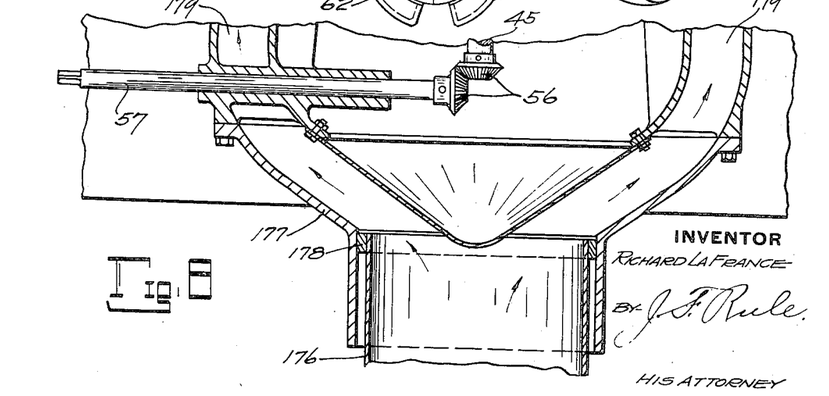
Figure 8 is a fragmentary sectional elevation of the lower portion of the machine.

Referring particularly to Figures 1 and 7, the finishing mold sections are carried on arms 154 journalled on a bearing sleeve 155. The arms 154 are connected through links 156 to a yoke 157 connected to a slide block 158 which reciprocates in guides 159 on the carriage, said guides extending radially of the machine. The yoke 157 is connected through a link 160 to a rock arm 162 on a rock shaft 163 to which is also connected a rock arm 164 having a cam roll 165 running in a stationary cam 166. This cam is shaped to effect the opening and closing of the finishing molds at predetermined times, as hereinafter noted. After the finishing mold has closed around the parison and the bottle blown, the neck mold is opened by means of a stationary cam roll 167 (Fig. 1) which contacts with the cam face of a bell crank lever 168 (see also Fig. 15) pivoted at 169 to a section 170 of the framework 116. The bell crank operates through a rod 172 to move the frame 138 radially outward, thereby opening the neck mold. A spring 173 returns the bell crank after it has passed the roll 167. The head 130 carrying the neck mold is now re-inverted by means of the cam 136 operating through the connections heretofore described. The cam 136 comprises a section 136ª (Fig. 30) which holds the neck mold steady during the blowing of the bottle in the finishing mold. During the return of the neck mold, the weight of the parts tends to swing the neck mold sections together and return the frame 138 to position to hold the mold closed. Positive closing of the neck mold, however, is insured by a roll 174 on the frame 138 coming in contact with the frame which supports the blank mold. The normal position of the blank mold is determined by an adjustable stop 175.

Figure 10:
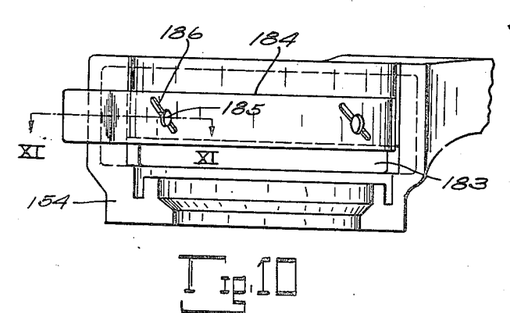
Figure 10 is a fragmentary view of a finishing mold supporting arm and shows means for adjusting the opening through which cooling air is supplied to the mold.
Figure 11:
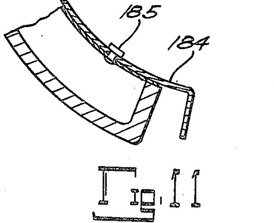
Figure 11 is a section at the line XI—XI on Figure 10.

Air for cooling the molds is supplied from any suitable source through a pipe or drum 176 (Fig. 8) which has a telescoping connection with the cylindrical end of a stationary hollow casting or drum 177 at the base of the machine, which permits vertical adjustment of the machine, a packing 178 being interposed between the parts 176 and 177. The air is conducted from the drum 177 through channels 179 (Fig. 1) in the lower section 35 of the mold carriage, and through ports 180 to nozzles 182 by which the air blasts are directed against the finishing mold bottoms. The channels 179 also communicate with the interior of the bearing sleeves 155 which, as shown in Figure 1, have ports opening into the hollow arms 154 which carry the finishing mold sections. The air channels through the arms 154 terminate in slots 183 (Figs. 9 and 10) through which the cooling air is directed against the molds. The size of the openings 183 is adjustable by means of sheet metal plates or dampers 184 attached to the inner faces of the mold arms and adjustable up and down to vary the width of the slot 183. This adjustment is permitted by mounting the plate 184 on studs 185 which extend through diagonal slots 186 in the plate. The amount of air passing through the nozzles 182 may be controlled by dampers 187 at the ports 180. A slide plate 190 (Figs. 1 and 7) forms a valve at the base of the bearing sleeve 155 and is adjustable by hand to regulate or entirely cut off the supply of air through the arms 154.

Air for cooling the blank molds is supplied through vertical pipes 188 (Fig. 9) connected at their lower ends to the hollow spider 35 and terminating at their upper ends in blowing heads 189 having nozzles through which the air is directed against the molds. The pipes 188 preferably comprise telescoping sections permitting the heads 189 to be adjusted up and down with the section 37 of the mold carriage.

If desired, suction may be applied at the neck mold for forming the neck of the bottle or other article. This may be used either instead of the air pressure applied through the blowing head 69 or in combination with such pressure. The means for exhausting the air will now be described.

Referring to Figures 2 and 3, a suction pipe 195 connected to a source of vacuum, connects with a central chamber 196 in the stationary drum 85, which chamber opens through a port 197 into an annular chamber 198 in a section 199 of the distributing head. The section 199 rotates with the section 89. Pipes 200 lead from the chamber 198 to an annular vacuum chamber 202 (see Figs. 1 and 4). Valves 203 control communication between the chamber 202 and the pipes 106, the latter communicating with the space surrounding the plunger 126 as heretofore described. Each valve 203 is periodically opened by means of a stationary cam 204 operating through a lever 205, thereby exhausting the air from the neck mold. The opening of the valve 203 takes place immediately after the charge of glass has been dropped into the mold, or if desired, the vacuum may be applied in time to assist gravity in forcing the glass downward into the mold. The air exhaustion also extends upward through channels or grooves 206 along the inner edges of the mold cavity, thereby assisting in exhausting the air from the mold.

The finishing mold bottom comprises an annular section 210 and a plunger section 211 movable up and down therein. This plunger, as shown, is shaped to form a reentrant bottom on the bottle. The section 211 is projected to the Figure 1 position by means of a cam 212 operating through a rod 213. The mold bottom, including said rod, is carried by a bracket 214 pivoted at 215 to permit the mold bottom to tilt outward and discharge the bottle after the finishing mold has opened. The mold bottom is returned by a stationary cam 216 on which runs a roll 217 on the bracket 214.

Figure 12:
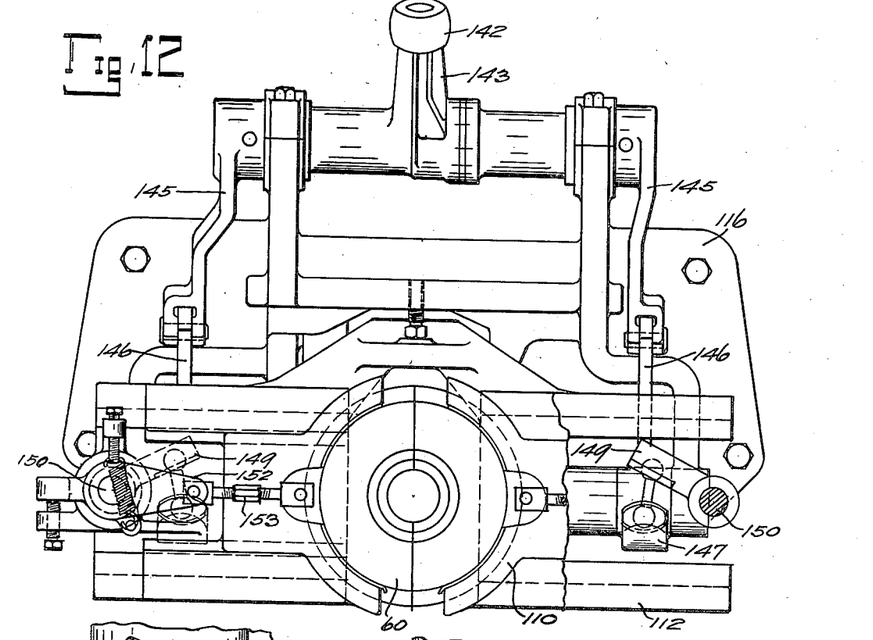
Figure 12 is a plan view of the turn-over group mechanism shown on Figure 9.
Figures 13, 14:
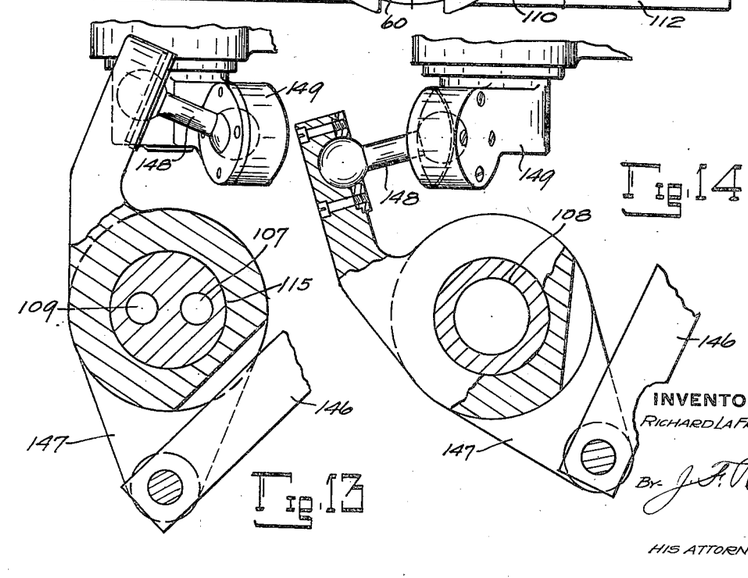
Figure 13 is a part sectional detail view of connections for opening and closing the blank mold.
Figure 14 is a view of the same with the parts in a different position.
Figures 21, 22, 23, 24, 25, 26, 27, 28:
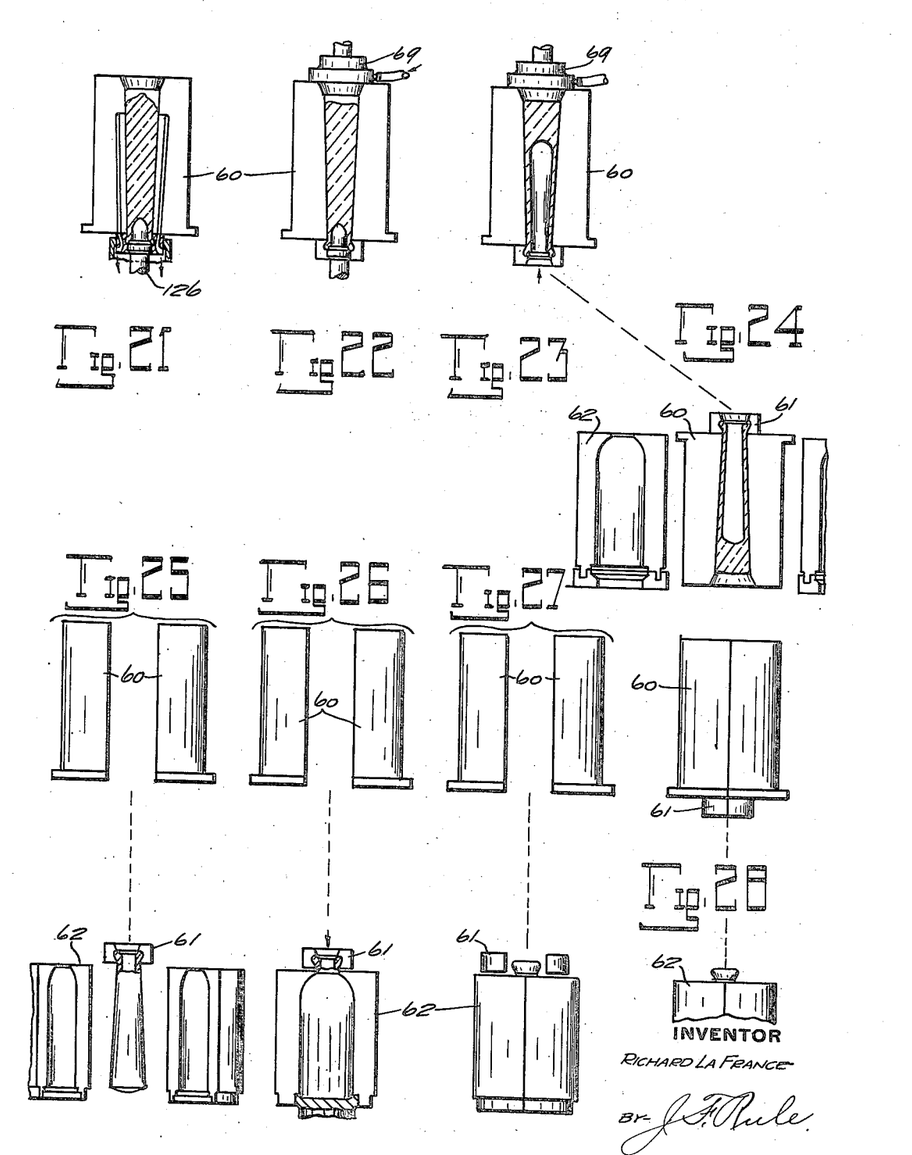
Figure 21 shows the parison mold immediately after it has received its charge of glass.
Figure 22 shows a blowing head brought down to close the charging end of the mold and supply air pressure for compacting the glass and forming the neck.
Figure 23 shows the parison blown in the mold after the plunger tip has been withdrawn.
Figure 24 shows the parison mold inverted or swung down between the sections of the open finishing mold.
Figure 25 shows the body blank mold swung up and the parison suspended from the neck mold, the finishing mold still being open.
Figure 26 shows the finishing mold closed about the parison.
Figure 27 shows the neck mold opened.
Figure 28 shows the neck mold returned to register with the blank mold and the latter closed ready to receive another charge of glass.
Figure 31:
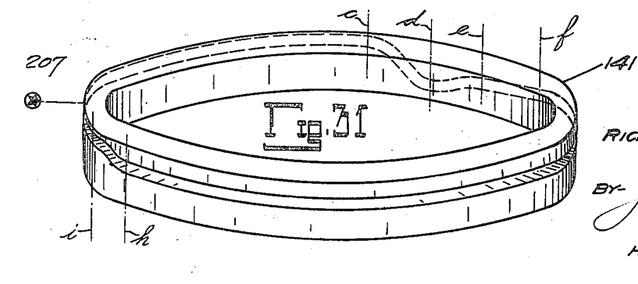
Figure 31 is a perspective view of the cam controlling the opening and closing movements of the blank mold.

The operation of the machine may be recapitulated as follows:

As the mold carriage rotates continuously the blank molds 60 are successively brought to the charging position indicated by a star 207. (See Figs. 29 to 31.) A charge of glass at this point is dropped through the funnel guide 66 into the mold, as shown in Figure 21. If vacuum is used to form the neck, the vacuum valve 203 is opened by its cam 204 (see Fig. 30) as the charge enters the mold. As the mold reaches the position indicated by radial line $a$ (Fig. 30) the cam 71 moves the plate 67 outward to bring the blowing head 69 over the mold. The cam 102 (Fig. 29) now operates at the point $m$ to supply air to the piston motor 77 and lower the blowing head onto the mold, as in Figure 22. The cam 101 then operates, as indicated at $n$, to supply air through the head 69 to compact the glass in the mold and form the neck. The cam 104 then operates, as indicated at $p$, to cut off the air supply below the plunger piston 128 and allow the plunger 126 to be lowered by means of the air pressure which is continuously maintained above the piston. At substantially the same time the cam 103 operates its valve, as indicated at $q$, to supply air pressure to the initial blow opening formed by the plunger tip 127, thereby expanding the blank in the blank mold, as in Figure 23. After this initial puff of air, the cam 102 operates at the point $r$ to lift the blow head away from the mold. As the blank mold reaches the radial position $b$ (Fig. 30) the cam 125 commences the mold inverting movement by which the blank mold and neck mold are swung down from the Figure 15 position to the Figure 18 position, these positions being shown also in Figures 23 and 24. During the inverting movement of the mold, the cam roll 142 travels from the position $c$ to the position $d$ (Fig. 31). This portion of the cam 141 is preferably shaped to clear the cam roll, the blank mold being held closed during its inverting movement by the straight toggles formed by the arms and links 152, 153 (Fig. 12). After the mold is fully inverted, the cam 141 operates between the points $d$ and $e$ to open the blank mold. Between the points $e$ and $f$ the cam 141 is shaped to hold the blank mold open while the cam 125 operates to re-invert it. During this re-inverting movement, the neck mold remains in its inverted position (having been released from the blank mold by the opening of the latter). This arrangement of the molds is shown in Figure 25. The finishing mold bottom plate is now moved up and the blow mold 62 closes around said plate and encloses the parison. The cam 103 now operates at the point $s$ (Fig. 29) to open its valve and supply air through the neck mold for blowing the bottle to finished form (Fig. 26). The neck mold is then opened (Fig. 27) by the stationary cam roll 167. The cam 136 now commences to operate at the position $g$ (Fig. 30) to re-invert the neck mold. During this re-inverting of the neck mold the cam 104 operates at the point $t$ (Fig. 29) to project the plunger tip. The cam 141 (between the points $h$ and $i$) now operates to close the blank mold, which is thus ready (Fig. 28) to receive a new charge.

Figures 29, 30:
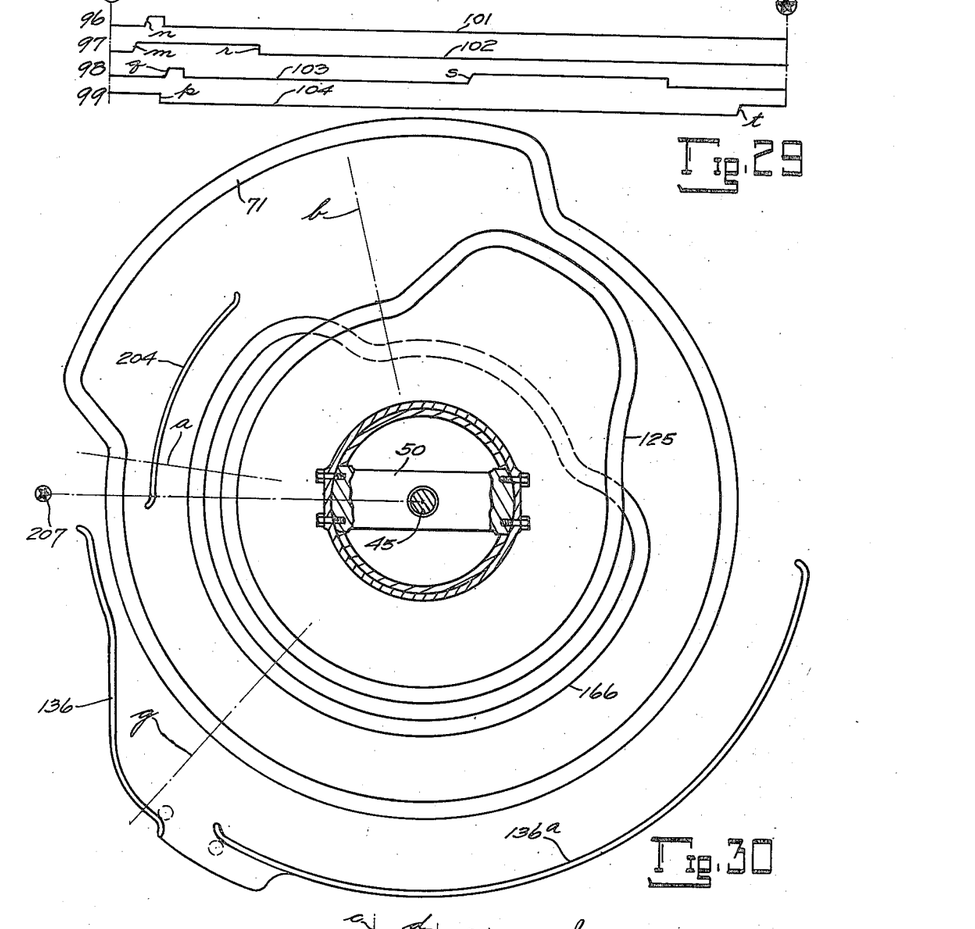
Figure 29 is a diagrammatic view showing a development of cams controlling the air supply for various operations.
Figure 30 is a diagrammatic view of various cams.

By reference to Figure 30, it will be seen that the cam 166 for opening and closing the finishing mold is so shaped that it will open the finishing mold before the blank mold commences its inverting movement. About the time or preferably just before the finishing mold opens, the mold bottom section 211 is moved vertically downward to clear the bottle. The bottom then tilts to discharge its bottle, and returns to horizontal position just before the blank mold reaches its inverted position,—that is to say, the tilting of the bottom plate and its return movement take place during the downward swing of the blank mold.

Modifications may be resorted to within the spirit and scope of my invention.

What I claim is:

1. The combination with a continuously rotating mold carriage, of a ring of molds thereon open at their upper ends to receive charges of glass, funnel guides individual to the molds, carrier plates on which the guides are mounted, said plates being mounted for radial sliding movement on the carriage, a stationary cam within said ring, and operating connections between said cam and said plates for successively moving the guides radially outward to a position beyond the ring of molds and for returning the guides to register with their respective molds.

2. The combination with a continuously rotating mold carriage, of a ring of molds thereon open at their upper ends to receive charges of glass, funnel guides individual to the molds, carrier plates on which the guides are mounted, said plates being mounted for radial sliding movement on the carriage, a stationary cam within said ring, operating connections between said cam and said plates for successively moving the guides radially outward to a position beyond the ring of molds and for returning the guides to register with their respective molds, and mold closing devices carried on said plates and each brought into a position over a mold as the corresponding guide is moved away from the mold.

3. In a glass forming machine, the combination of a blank mold open at its upper end to receive a charge of glass, a neck mold beneath and in register with the blank mold, automatic means to swing said molds downward about a horizontal axis to an inverted position with the glass therein, means to open the inverted blank mold leaving the blank suspended from the neck mold, means to return the open blank mold, a finishing mold, and means to close it about the suspended blank after the blank mold has returned.

4. In a glass forming machine, the combination of a blank mold open at its upper end to receive a charge of glass, a neck mold beneath and in register with the blank mold, automatic means to swing said molds downward about a horizontal axis to an inverted position with the glass therein, means to open the inverted blank mold leaving the blank suspended from the neck mold, means to return the open blank mold, a finishing mold, means to close it about the suspended blank after the blank mold has returned, and means to open the neck mold and re-invert it after the blank mold has been re-inverted.

5. In a glass forming machine, the combination of a blank mold, a neck mold, means to invert the blank mold and carry with it the neck mold, and means for separately reinverting said molds.

6. In a glass forming machine, the combination of a blank mold open at its upper end to receive a charge of glass, a neck mold beneath and in register with the blank mold, means to simultaneously invert said molds and means to separately re-invert said molds.

7. In a glass forming machine, the combination of a blank mold open at its upper end to receive a charge of glass, a neck mold beneath and in register with the blank mold, means to simultaneously invert said molds, and means to re-invert the blank mold while the neck mold remains in its inverted position.

8. In a glass forming machine, the combination of a blank mold open at its upper end to receive a charge of glass, a neck mold beneath and in register with the blank mold, means to simultaneously invert said molds, means to open the blank mold, and means to then re-invert it while the neck mold remains inverted.

9. In a glass forming machine, the combination of a blank mold open at its upper end to receive a charge of glass, a neck mold beneath and in register with the blank mold, means to simultaneously invert said molds, means to re-invert the blank mold while the neck mold remains in its inverted position, means to open the neck mold, and means to re-invert it.

10. In a glass forming machine, the combination of a blank mold open at its upper end to receive a charge, a neck mold having an interlocking connection with the blank mold, automatic means to swing the blank mold downward to an inverted position and carry with it the neck mold and to return the blank mold without returning the neck mold, and means to open the blank mold while in said inverted position and thereby release it from the neck mold so that the latter is not returned with the blank mold.

11. In a glass forming machine, the combination of a blank mold open at its upper end to receive a charge, a neck mold having an interlocking connection with the blank mold, automatic means to swing the blank mold downward to an inverted position and carry with it the neck mold and to return the blank mold, means to open the blank mold while in said inverted position and thereby release it from the neck mold so that the latter is not returned with the blank mold, a finishing mold, means to close it about the blank suspended from the neck mold after the blank mold has been re-inverted, and means to blow the blank in the finishing mold.

12. In a glass forming machine, the combination of a blank mold open at its upper end to receive a charge, a neck mold having an interlocking connection with the blank mold, automatic means to swing the blank mold downward to an inverted position and carry with it the neck mold and to return the blank mold, means to open the blank mold while in said inverted position and thereby release it from the neck mold so that the latter is not returned with the blank mold, a finishing mold, means to close it about the blank suspended from the neck mold after the blank mold has been re-inverted, means to blow the blank in the finishing mold, means to open the neck mold after the finishing mold is closed, and means to re-invert the neck mold.

13. The combination of a mold carriage rotatable about a vertical axis, a mold thereon comprising sections moveable to and from each other in a direction transverse to the radius of the mold carriage extending to the mold center, means for turning the mold from an upright to an inverted position, a stationary cam, and operating connections between the cam and the mold sections for opening and closing the mold, said connections being operative both while the mold is in said upright position and while in its inverted position.

14. The combination of a rotary mold carriage, a sectional mold, a carrier on the mold carriage and on which the mold sections are mounted to move to and from each other in a direction substantially parallel with their direction of movement with the mold carriage, for closing and opening the mold, said carrier mounted to rotate about a horizontal axis for swinging the mold from an upright to an inverted position and to return the mold, a stationary cam, and operating connections between said cam and the mold sections for opening and closing the mold, said operating connections being maintained while the mold is in both said upright and said inverted positions.

15. In a glass forming machine, a mold carriage rotatable about a vertical axis, said carriage comprising sections arranged one above another, and means for simultaneously adjusting said sections up or down, said means operative to impart a greater movement to one section than the other, whereby a relative adjustment of said sections is effected.

16. In a glass forming machine, the combination of a rotating mold carriage comprising a plurality of sections, and adjusting means operative to simultaneously adjust said sections up or down and effect a greater movement of one section than of the other.

17. In a glass forming machine, the combination of a rotating mold carriage comprising a plurality of sections, and adjusting means operative to simultaneously adjust said sections in an upward direction and cause a greater movement of the upper section, whereby the distance between said sections is increased as they are moved upward.

18. In a glass forming machine, a rotary mold carriage comprising sections arranged one above the other, an adjusting device operative to adjust said sections up or down and cause a simultaneous relative adjustment of the sections, and means to prevent said relative adjustment and thereby permit the sections to be adjusted without relative movement.

19. In a glass forming machine, the combination of a rotary mold carriage comprising sections arranged one above the other, an adjusting device operative to simultaneously adjust said sections up or down, said adjusting device being operative to move one section at a greater speed than the other, whereby a relative adjustment of the sections is effected, and means for adjusting one section up or down independently of the other.

20. In a glass forming machine, the combination of a rotating mold carriage comprising a lower section, an intermediate section and an upper section, and an adjusting device operative to simultaneously adjust the intermediate and upper sections up or down while the lower section remains stationary, said adjusting device being arranged to impart a greater adjustment to the upper section than to the intermediate section, whereby a relative adjustment of said two last-mentioned sections is effected.

21. In a glass forming machine, the combination of a rotating mold carriage comprising a lower section, an intermediate section and an upper section, and an adjusting device operative to simultaneously adjust the intermediate and upper sections up or down while the lower section remains stationary, said adjusting device operative to move the upper section through twice the distance that the intermediate section is moved, whereby the relative adjustment between the lower and intermediate section is equal to that between the upper and intermediate section.

22. A glass forming machine comprising a mold carriage rotatable about a vertical axis, said carriage comprising upper, lower and intermediate sections, and an adjusting device comprising a differential screw rod engaging differential screw threads on the intermediate and upper section.

23. A glass forming machine comprising a mold carriage rotatable about a vertical axis, said carriage comprising upper, lower and intermediate sections, and an adjusting device comprising a vertical rod having screw threads engaging threads formed on the intermediate and upper sections, the threads on the upper section having double the pitch of those on the intermediate section.

24. In a glass forming machine, the combination of a mold carriage rotatable about a vertical axis, said carriage comprising sections one above another, and a vertically disposed adjusting rod having screw threads engaging the respective sections.

25. In a glass forming machine, the combination of a mold carriage rotatable about a vertical axis, said carriage comprising sections one above another, and a vertically disposed adjusting rod having screw threads engaging the respective sections, the pitch of the thread for the upper section being double that of the thread for the lower section.

26. In a glass forming machine, the combination of a central vertical stationary column, a mold carriage comprising sections arranged one above the other and rotatable about said column, a central vertical adjusting shaft, and yokes slidable up and down in said column and forming supports for the said sections, said rod having screw threaded connections with said yokes whereby rotation of said rod effects an adjustment of said sections up or down.

27. In a glass forming machine, the combination of a central vertical stationary column, a mold carriage comprising sections arranged one above the other and rotatable about said column, a central vertical adjusting shaft, yokes slidable up and down in said column and forming supports for the said sections, said rod having screw threaded connections with said yokes whereby rotation of said rod effects an adjustment of said sections up or down, and means for rotating said rod, the pitch of the screw thread in the upper yoke being greater than that of the thread in the lower yoke.

28. A glass forming machine comprising, in combination, a central vertical column, a mold carriage mounted to rotate about said column and comprising upper, lower and intermediate sections, a vertical shaft journalled in said column, means to rotate the said shaft, and yokes movable up and down in said column and connected respectively to the intermediate and upper carriage sections, said rod having screw threads engaging corresponding threads in said yokes, the thread for the upper yoke having double the pitch of that for the lower yoke, whereby when said rod is rotated the upper and intermediate sections are moved toward and from the lower section and a relative movement is effected between the upper and intermediate sections.

29. In a glass forming machine, the combination of a mold carriage comprising sections arranged one above another, an adjusting device comprising a vertical rod having screw threaded connections with said sections, one of said sections comprising a sleeve threaded on the rod and journalled in one of said sections, means to rotate said sleeve on the rod and thereby adjust said last-mentioned section independently of the other, and means to hold said sleeve against rotation whereby a rotation of said rod will simultaneously adjust both said sections.

30. In a glass forming machine, the combination of a mold carriage comprising upper, lower and intermediate sections, a blank mold and neck mold on the intermediate section, a device on the upper section to form a closure for the upper end of the blank mold, means to invert the neck mold, and adjusting means operative to simultaneously adjust the intermediate and upper sections up or down, the movement of the upper section being double that of the intermediate section.

31. A continuously rotating automatic glass forming machine comprising a series of sectional molds, means for inverting each mold with a charge of glass therein and for reinverting the mold, mechanisms for opening and closing the molds, and a stationary cam to control the operation of said opening and closing mechanisms, said cam operable to hold the mold open during its reinverting movement.

32. In a glass forming machine, the combination of a rotary mold carriage, molds thereon, each comprising separable sections, hollow arms carrying said sections, hollow shafts on which said arms swing for opening and closing the molds, said hollow shafts and arms providing communicating air passages through which cooling air is supplied, means for distributing cooling air to said hollow shafts, and means for directing the cooling air from said arms against the mold sections.

33. In a glass forming machine, the combination of a mold carriage rotatable about a vertical axis and comprising upper and lower mold carrying sections relatively adjustable vertically, an air pipe comprising telescoping parts carried respectively by said sections, and means for supplying air through said pipe.

34. In a glass working machine the combination of a rotary mold carrier, a plurality of partible blank molds articulated to and supported by said carrier having their upper ends open for the receipt of a charge of glass from above, a plurality of neck molds arranged to cooperate with associate blank molds for the formation of glass parisons, means for automatically opening and closing said blank and neck molds, automatic means operable in a predetermined order and time for swinging the associated blank and neck molds in a vertical plane radial of the machine about a horizontal axis from a neck-down position to a neck-up position while closed and for thereafter returning said molds to their original position, a plurality of blow molds one for each blank mold occupying a neck-up position to receive blanks from the blank molds when the latter are opened, and means for blowing the blanks to final form in the blow molds.

Signed at Toledo, in the county of Lucas and State of Ohio, this 25th day of January, 1922.

RICHARD LA FRANCE.